US007427184B1

(12) United States Patent
Vespoli

(10) Patent No.: US 7,427,184 B1
(45) Date of Patent: Sep. 23, 2008

(54) BOAT LIFT SYSTEM FOR A TRAILER

(75) Inventor: Michael Vespoli, Guilford, CT (US)

(73) Assignee: Vespoli, USA, New Haven, CT (US)

( * ) Notice: Subject to any disclaimer, the term of this patent is extended or adjusted under 35 U.S.C. 154(b) by 125 days.

(21) Appl. No.: 11/272,256

(22) Filed: Nov. 9, 2005

(51) Int. Cl.
  *B60P 3/10* (2006.01)
(52) U.S. Cl. ............... 414/679; 280/414.1; 414/540
(58) Field of Classification Search ........... 414/540, 414/541, 679, 331.06, 331.11; 280/414.1, 280/79.3
  See application file for complete search history.

(56) References Cited

U.S. PATENT DOCUMENTS

| | | | | |
|---|---|---|---|---|
| 3,142,396 | A * | 7/1964 | Pauley et al. | 414/812 |
| 3,190,473 | A * | 6/1965 | Loef | 414/541 |
| 3,610,431 | A * | 10/1971 | Rodden | 211/207 |
| 3,841,503 | A * | 10/1974 | Hollenbach | 414/541 |
| 4,236,861 | A * | 12/1980 | Grove | 414/540 |
| 4,362,459 | A * | 12/1982 | Klausbruckner et al. | 414/584 |
| 4,678,390 | A * | 7/1987 | Bonneton et al. | 414/282 |
| 5,096,216 | A * | 3/1992 | McCalla | 280/414.1 |
| 5,211,523 | A * | 5/1993 | Andrada Galan et al. | 414/282 |
| 5,443,350 | A * | 8/1995 | Wilson | 414/495 |
| 5,836,636 | A * | 11/1998 | Adams | 296/24.4 |
| 7,070,196 | B1 * | 7/2006 | Larsen et al. | 280/414.1 |
| 7,104,429 | B1 * | 9/2006 | Flores | 224/405 |
| 2004/0086367 | A1 * | 5/2004 | Isaacs | 414/679 |

OTHER PUBLICATIONS

Prior Art Boat Trailer—Photos 1 and 2 show a prior art trailer for carrying rowing shells, as described in the Description of Related Art section of the instant application.
Prior Art Boat Manual Lift—Photo 3 shows a prior art manual lift for rowing shells, as described in the Description of Related Art section of the instant application.

* cited by examiner

*Primary Examiner*—James Keenan
(74) *Attorney, Agent, or Firm*—DeLio & Peterson, LLC; Peter W. Peterson

(57) ABSTRACT

A system and method of lifting and transporting a boat. A boat carrier has a chassis supported by wheels and a boat-carrying frame. The boat-carrying frame includes a plurality of outwardly-extending frame members for securing a boat during transit of the carrier and at least one lift assembly mounted thereon. The lift assembly includes at least one vertically moveable lift assembly arm extending away from the boat-carrying frame beyond the outwardly-extending frame members. The lift assembly arm is moveable between a lowered position whereby a boat may be placed on the lift assembly arm and a raised position aligned with one of the outwardly-extending frame members. The boat is placed on the lift assembly arm in the lowered position from a point outward of the outwardly-extending frame members and lifted with the lift assembly arm to the raised assembly arm position aligned with one of the outwardly-extending frame members. The boat may then be transferred from the lift assembly arm onto the aligned outwardly-extending frame member.

15 Claims, 5 Drawing Sheets

BOAT LIFT SYSTEM FOR A TRAILER

BACKGROUND OF THE INVENTION

1. Field of the Invention

The present invention relates to an apparatus and method for lifting boats onto a boat carrier

2. Description of Related Art

Rowing shells and other boats are carried on boat trailers or other types of carriers that have several levels of racks adapted to securely hold and transport the boats. In order to safely raise the boats onto the sections of the boat carrier, they are raised by hand or are placed on the forks of one or more separate manual lifts. These manual lifts have a number of problems that have not been addressed in the prior art. Several of the problems associated with the manual lift stem from the lift base using the ground for its support. The first problem created is due to the operator having to transport the manual lift in order to use it at the boat carrier destination as well as at the initial loading area. To be able to transport the manual lift, the operator needs to raise it from the ground to the boat carrier and, at the destination location, move it from the boat carrier back down to the ground. This forces the operator to spend the extra time and effort to load, secure, detach and unload the manual lift from the boat carrier. The manual lift is often heavier than the boat since it is a metal structure needing enough strength to hold a boat while allowing ground support for balance of itself and the boat. The second problem associated with the manual lift using the ground for support, is the inconsistency of the ground cover supporting the manual lift. The manual lift, having wheels for horizontal movement, will not roll easily in a variety of ground cover including gravel, stone, sand, grass, and dirt. Another safety issue relating to the manual lift being on the ground is the levelness of the ground supporting the manual lift. If the ground is sloped too much, the center of gravity becomes a major issue as the height of the boat in the raised position is increased.

Another problem associated with the manual lift of the prior art is that at least two lifts are needed to raise the boat safely, because of balance issues. This means that an operator must position the boat near the trailer, and maneuver both manual lifts into position on the side opposite the trailer. After positioning the boat on the two manual lifts, ideally one operator is needed for each manual lift in order to synchronously raise the boat. Even then, the operators must match their cranking speed by continually adjusting to match their rate to the other operator.

SUMMARY OF THE INVENTION

Bearing in mind the problems and deficiencies of the prior art, it is therefore an object of the present invention to provide a boat lift apparatus which allows a boat to be easily loaded on the upper sections of a boat carrier.

It is another object of the present invention to provide a boat lift apparatus which increases safety of the operator during the loading or unloading of a boat onto or off of a boat carrier.

A further object of the invention is to provide a boat lift apparatus which minimizes the time and effort an operator must expend during the loading and unloading of the boat It is yet another object of the present invention to provide a method of making and using a boat lift apparatus which overcomes the mechanical and safety limitations of the manual lift of the prior art.

Still other objects and advantages of the invention will in part be obvious and will in part be apparent from the specification.

The above and other objects, which will be apparent to those skilled in the art, are achieved in the present invention which is directed to a boat lift system for a boat trailer comprising a boat trailer having a chassis supported by wheels, a trailer hitch for securing to a powered vehicle, and a boat-carrying frame including a plurality of substantially horizontal members for securing a boat during transit of the boat trailer. Mounted on the boat trailer is at least one lift assembly which includes at least one substantially horizontal vertically moveable member. The vertically moveable member is moveable between a lowered position whereby a boat may be placed on the vertically moveable member and a raised position. The vertically moveable member is adapted to receive a boat in the lowered position from a point outward of the vertically moveable member to lift the boat into a raised position.

In a related aspect, the invention is directed to a boat lift system for a boat carrier comprising a boat carrier having a chassis supported by wheels and a boat-carrying frame including a plurality of outwardly-extending frame members for securing a boat during transit of the boat carrier. Mounted on the boat carrier is at least one lift assembly which includes at least one vertically moveable lift assembly arm extending away from the boat-carrying frame beyond the outwardly-extending frame members. The lift assembly arm is moveable between a lowered position whereby a boat may be placed on the lift assembly arm and a raised position aligned with one of the outwardly-extending frame members whereby the boat may be transferred from the lift assembly arm onto the outwardly-extending frame member.

In one aspect of the boat carrier, the frame includes front and rear upwardly-extending members on the boat carrier chassis, with at least one lift assembly associated with at least one of the upwardly-extending members. The preferred boat carrier has a front lift assembly associated with a front upwardly-extending member and a rear lift assembly associated with a rear upwardly-extending member.

The preferred lift assembly includes a lift assembly arm removably mounted on the moveable carriage. The lift assembly arm may be aligned with one of the outwardly-extending frame members to allow the boat to be slid from the lift assembly arm onto the outwardly-extending frame member. The boat-carrying frame includes a plurality of outwardly-extending frame members on either side of the boat carrier and the lift assembly arm may be positioned to extend beyond the outwardly-extending frame members on either side of the trailer. The outwardly-extending members may be at a plurality of different heights and the lift assembly arm may be aligned at each of the different heights.

Preferably, the lift assembly arm includes an inward portion positionable alongside the outwardly-extending frame members when the lift assembly arm is in the raised position. The lift assembly arm is adapted to receive a boat in the lowered position from a point outward of the outwardly-extending frame members and to lift the boat to the lift assembly arm raised position aligned with one of the outwardly-extending frame members so that the boat may be slid inward from the lift assembly arm to the outwardly-extending frame members. The lift assembly arm may include an arm extension removably attached to an outward portion of the lift assembly arm.

Preferably, the boat carrier is a trailer having a hitch for securing to a motor vehicle.

In another aspect, the present invention is directed to a method of lifting and transporting a boat on a boat carrier. There is initially provided a boat carrier having a chassis supported by wheels and a boat-carrying frame. The boat-carrying frame includes a plurality of outwardly-extending frame members for securing a boat during transit of the carrier and at least one lift assembly mounted thereon. The lift assembly includes at least one vertically moveable lift assembly arm extending away from the boat-carrying frame beyond the outwardly-extending frame members. The lift assembly arm is moveable between a lowered position whereby a boat may be placed on the lift assembly arm and a raised position aligned with one of the outwardly-extending frame members. The method then includes placing a boat on the lift assembly arm in the lowered position from a point outward of the outwardly-extending frame members and lifting the boat with the lift assembly arm to the raised assembly arm position aligned with one of the outwardly-extending frame members. The boat may then be transferred from the lift assembly arm onto the aligned outwardly-extending frame member.

In the preferred method of using the boat carrier, there are front and rear upwardly-extending members on the boat carrier chassis with a front lift assembly associated with the front upwardly-extending member and a rear lift assembly associated with the rear upwardly-extending member. One end of the boat is placed on a front lift assembly arm on the front lift assembly and the other end of the boat is placed on a rear lift assembly arm on the rear lift assembly. Both the front and rear lift assembly include a moveable carriage where the lift assembly arm is removably mounted to either side of the moveable carriage prior to placing the boat on the lift assembly arm. The boat is placed on the lift assembly arm in the lowered position from a point outward of the lift assembly arm. The inward portion of the lift assembly arm is positionable alongside the outwardly-extending frame members when the lift assembly arm is in the raised position, so the boat in the raised position is slid inward from the lift assembly arm to the one of the outwardly-extending frame members.

In the preferred method of using the lift assembly, an arm extension is additionally provided to be removable attachable to the outward portion of the lift assembly arm, so the arm extension may be attached to extend the boat beyond the outwardly-extending frame members.

The outwardly-extending frame members may be at a plurality of different heights and the lift assembly arm may be aligned at each different height of the outwardly-extending frame members. The lift assembly arm includes an inward portion positionable alongside the outwardly-extending frame members when the lift assembly arm is in the raised position. The lift assembly arm is adapted to receive a boat in the lowered position from a point outward of the outwardly-extending frame members so that the boat may be lifted by the lift assembly arm to the raised position aligned with one of the outwardly-extending frame members. The boat may then be slid inward from the lift assembly arm to the one of the outwardly-extending frame members.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, a boat lift system for a boat carrier, reference will be made herein to FIGS. 1-5 of the drawings in which like numerals refer to like features of the invention. The boats for which the present invention is particularly directed are rowing shells, such as those disclosed in U.S. Pat. Nos. 5,067,426, 5,188,048, 5,474,008 and 5,279,239, the disclosures of which are hereby incorporated by reference. The present invention may be used to carry other types of boats as well.

Figure 1:
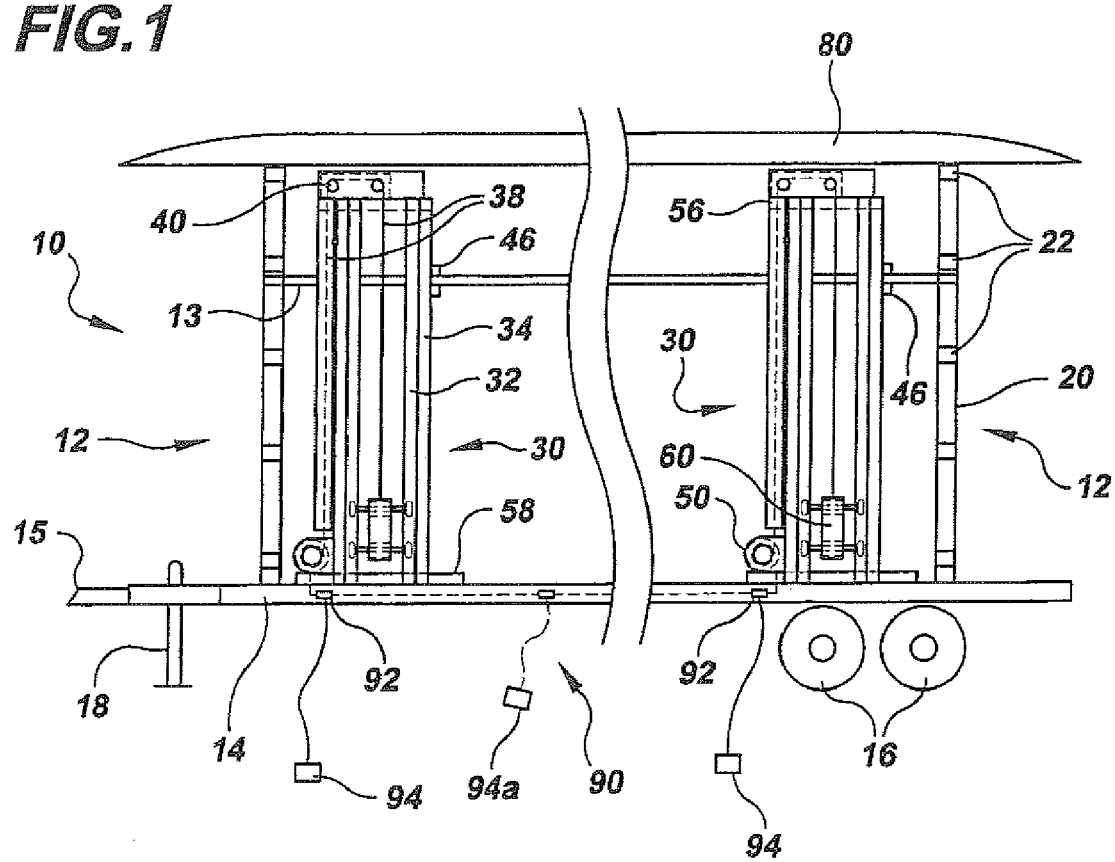
FIG. 1 is a side elevational view of the preferred boat carrier incorporating the lifting apparatus of the present invention.
Figure 2:
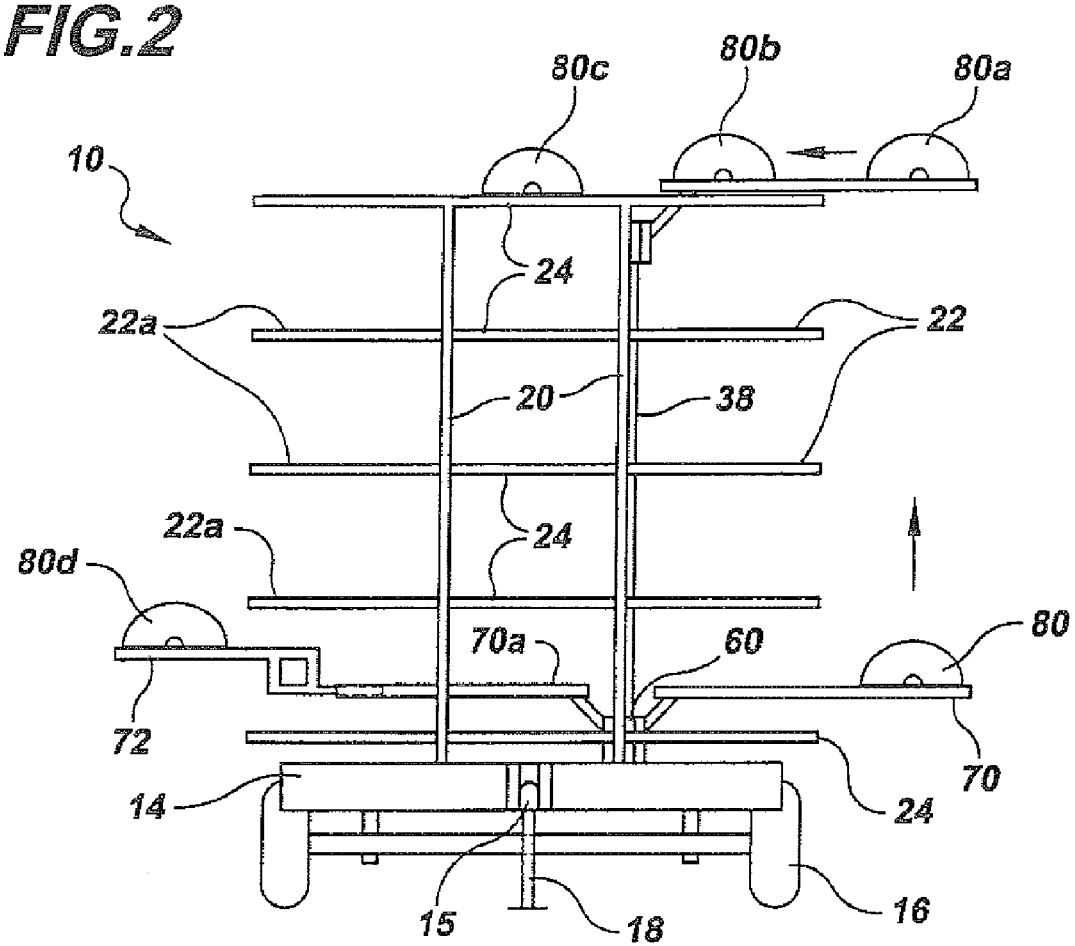
FIG. 2 is a front elevational view of the preferred boat carrier of FIG. 1 showing the positions of the boat during the lifting operation.

As depicted in FIGS. 1 and 2, the boat carrier 10 is typically a trailer having a boat-carrying frame 12 mounted on a chassis 14, with the chassis being supported by wheels 16. The boat carrier trailer also has a trailer jack 18 and a trailer hitch 15 near the front so that it may be easily attached and towed by a pickup truck or other motor-powered vehicle. Alternatively, the boat carrier may have its own motor power.

Boat carrying frame 12 is a vertical and horizontal boat storage rack system that includes front and rear essentially vertical, upwardly-extending members 20 attached to the chassis and upon which are mounted substantially horizontal outwardly-extending frame members 22. Two vertical support members make up a set at each position shown along the length of the boat carrier, and each upwardly-extending member 20 in the set has one or more horizontal outwardly-extending frame members 22, so that the carrier has outwardly-extending frame members 22 on each side. Additional sets of upwardly-extending members 20 with associated outwardly-extending frame members 22 may be provided, depending on the length of the boats to be carried, to provide sufficient spaced support along the length of the boats. Horizontal cross members 13 connect the sets of upwardly-extending members 20 along the length of the carrier. Since eight man rowing shells may have a length in excess of 50 ft., typically at least three spaced outwardly-extending frame members 22 are provided along the boat length. Each upwardly-extending member 20 preferably includes a plurality of vertically spaced outwardly-extending frame members 22, with five (5) being shown in FIGS. 1 and 2, to stack the boats on the boat-carrying frame 12 at different levels. The outwardly-extending frame members 22 are each cantilevered to a upwardly-extending member, with the free end extending away from the upwardly-extending member so that the boats may be loaded inward from a position alongside the boat carrier. The outwardly-extending frame members 22 are positioned to allow boat 80 to be placed thereon and securely attached thereto by flexible cords, line or other known attachment means. Additional horizontal support members 24 are provided between each set of upwardly-extending members 20, for additional boat carrying space in the center portion. These center boats are typically loaded from the front or back of the carrier. In the embodiment shown, the boat carrier may hold five boats on each side, plus five boats in the center.

Figure 3:
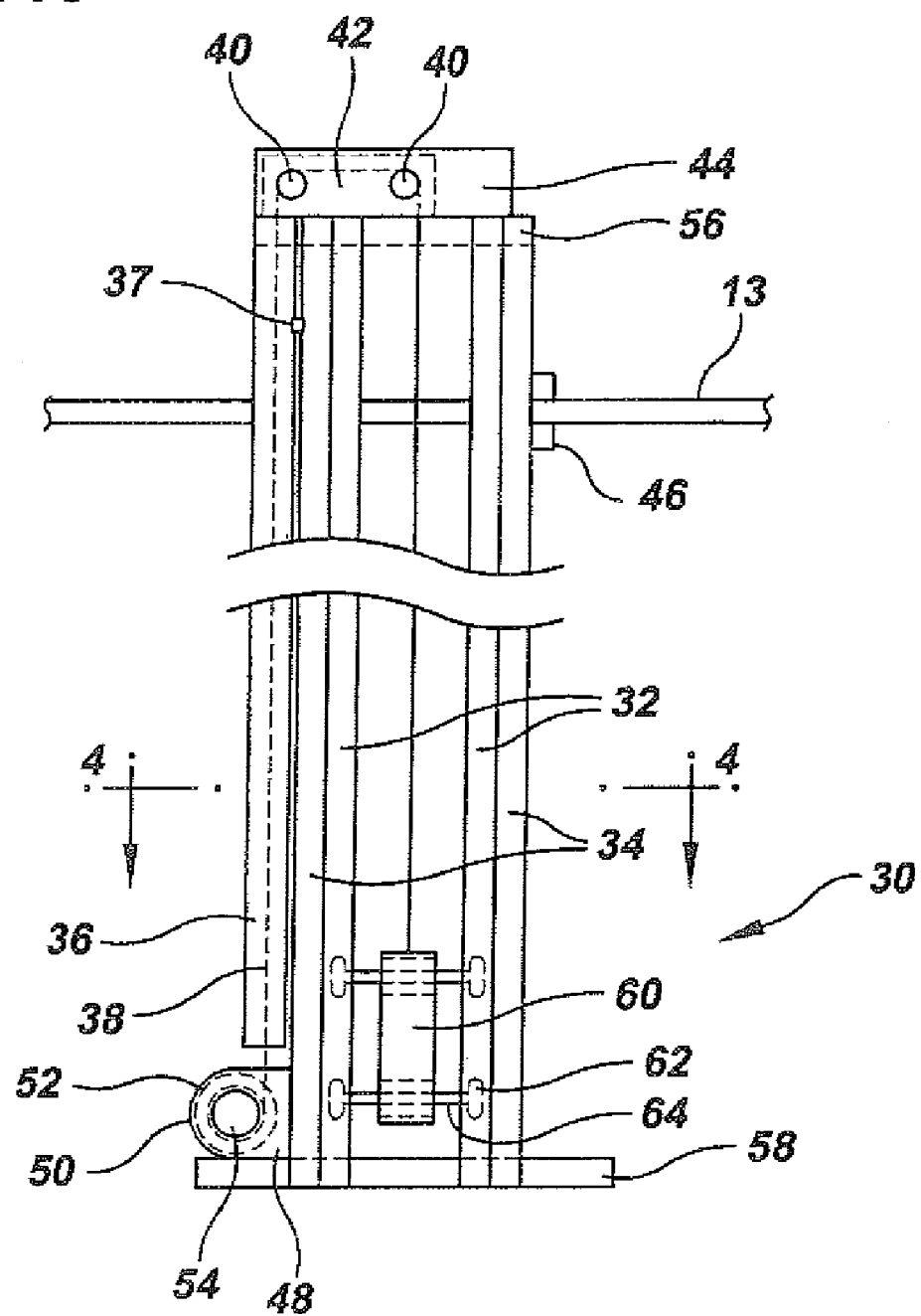
FIG. 3 is a side elevational view of the preferred lift assembly used on the boat carrier of FIG. 1 without the lift arm attached.

To provide the ability to easily lift and load boats onto the boat carrier, there are provided a pair of boat lift assemblies 30, one near the front of the boat carrier and one near the rear. As shown in more detail in FIGS. 3-5, lift assembly 30 is attached at lift support members 34 to cross member 13 of the boat-carrying frame by lift support bracket 46 and to the chassis 14 by lift base member 58. Moveably secured to the lift assembly is a moveable carriage 60 guided by a set of guide wheels 62, rotatably attached to the moveable carriage by guide wheel axles 64. The guide wheels move within a set of vertical guide wheel tracks 32, secured along lift support members 34, to permit the carriage to move in a substantially linear vertical path. The upper end of the lift assembly has a lift top member 56 (FIG. 3) which connects the tracks 32. FIGS. 2 and 3 show an embodiment and general function of the lift assembly 30. To provide power to move the carriage, there is provided electric winch 50 which is secured by its winch bracket 48 to one of the lift support members 34. The winch motor 52 turns winch drum 54, upon which is wound cable 38. Cable 38 is bounded by a cable guard 36 as it travels upward, around two top pulleys 40 at the top of the lift assembly 30, and then downward to moveable carriage 60, connected to the opposite end of the cable. The two top pulleys are mounted rotatably on a pulley bracket 42 and covered with a pulley guard 44. Cable guard 36 is attached to one of the lift support members 34 using a cable guard bracket 37. As shown in FIG. 1, one lift assembly 30 is preferably disposed adjacent one vertical frame member 20 of each of the front- and rear-most set of vertical frame members, for a total of two lift assemblies. Alternatively, fewer or more lift assemblies may be used for the boat carrier, depending on the degree of lift assistance required. A control system 90 is provided to activate each winch motor to move the carriages up or down, depending on motor direction. An activation switch 94 may be connected to each of the motor controls 92 of the control system 90 by a cable of sufficient length for the operator to stand and move alongside the length of the boat carrier during the lifting operation, or may be wirelessly connected to the control system. The motor controls 92 alternatively may be connected and synchronized using a common activation switch 94a so that the carriages move in the same direction in unison.

Figure 4:
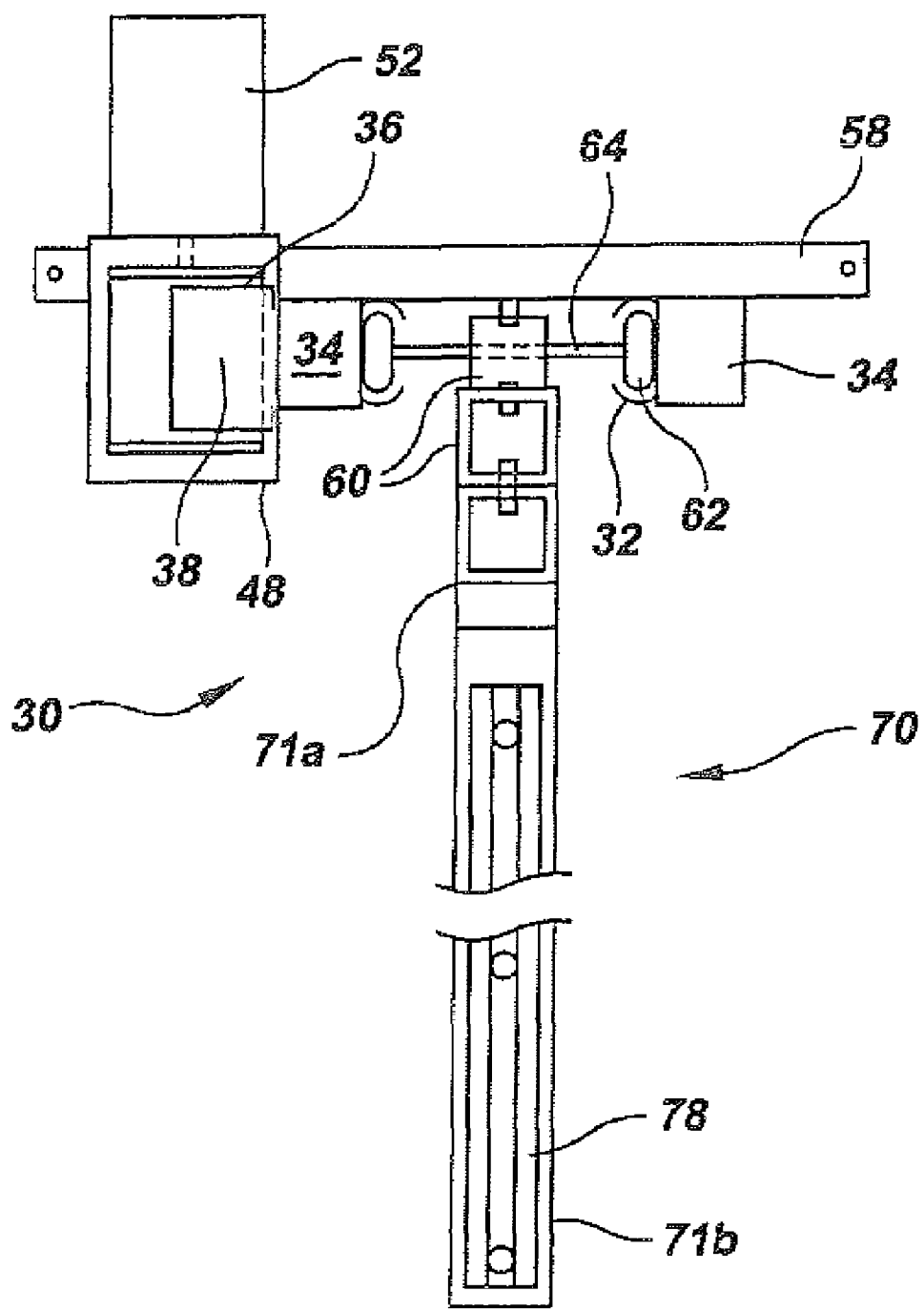
FIG. 4 is a top plan view, partially cut-away, showing the lift assembly of FIG. 3 with the lift assembly arm attached.
Figure 5:
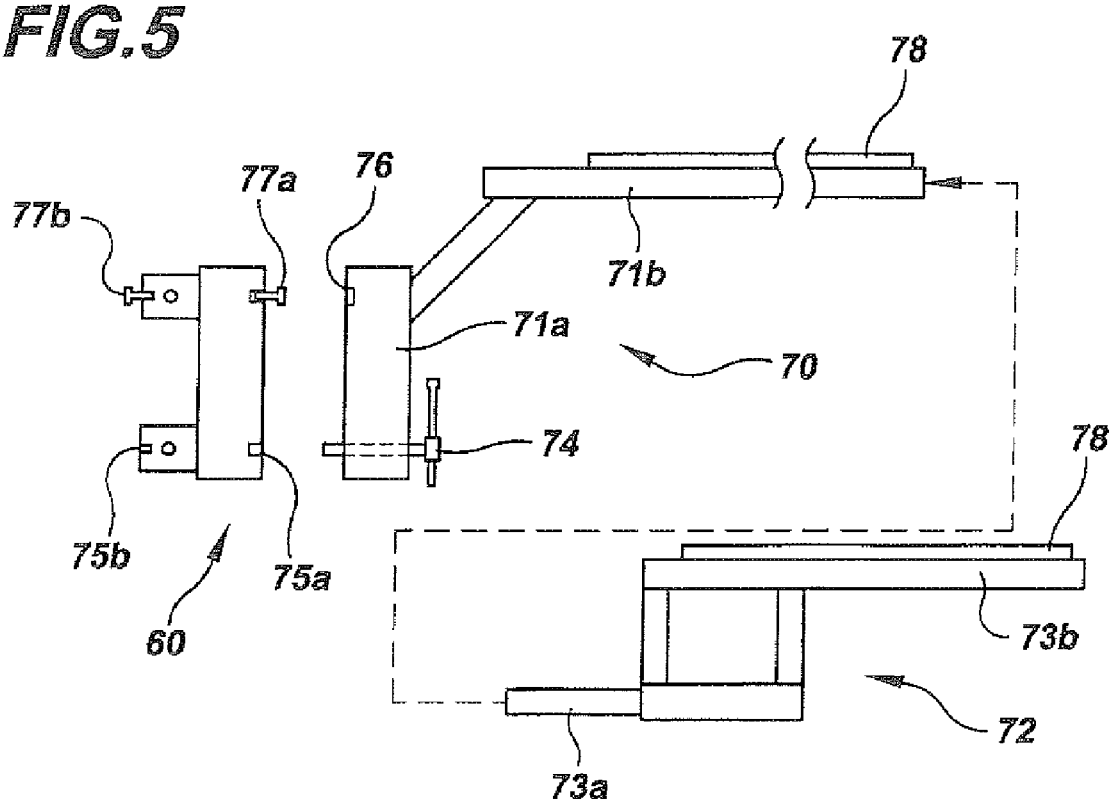
FIG. 5 is an exploded front elevational view of the preferred lift assembly arm and arm extension of the lift assembly of FIG. 3.

FIGS. 2, 4 and 5 show the lift assembly arm 70 upon which the boat end is placed near ground level before the lift assembly transfers it upward to be moved onto the boat carrier horizontal frame members 22. Lift assembly arm 70 is removably attached to moveable carriage 60 by arm bracket 71a. A keyhole slot 76 at the top portion of arm bracket 71a is placed slidingly onto a keyhole bolt 77a at the top portion of the moveable carriage and an attachment handle 74 at the lower portion of the arm bracket has a threaded end portion to attach within the threads of a correspondent T-nut 75a on the lower portion of the moveable carriage. Both keyhole bolt 77a and T-nut 75a are disposed on the side of the moveable carriage facing the closest side of the boat carrier. The lift assembly arm 70 includes a horizontal arm member 71b that holds the boat 80 during lifting. When the lift assembly is being used to raise a boat on the same side of the boat carrier that the lift assembly is located, the outward end of horizontal arm member 71b extends beyond the outwardly-extending frame member. The horizontal arm member 71b and the outwardly-extending frame members 22 have an arm cushion 78 attached on their upper surfaces to protect the boat 80 during loading, transport, and unloading.

FIGS. 2 and 5 also show arm extension 72 which is attached to the lift assembly arm 70 when the lift assembly 30 is used to raise a boat 80 on the opposite side of the boat carrier 10 from which the lift assembly is located. Arm extension 72 includes arm insert member 73a which may be slid into the open end of horizontal arm member 71b to secure the arm extension to arm 70. Arm extension 72 includes horizontal arm member 73b, vertically offset from insert member 73a, that holds the boat. When the lift assembly is being used to raise a boat on the opposite side of the boat carrier that the lift assembly is located, arm bracket 71a of arm 70 is attached to opposite side keyhole bolt 77b and T-nut 75b in a manner similar to that previously discussed. The insert member 73a of arm extension 72 is then slid into the outward end of arm extension 71b. In this position the horizontal arm member 73b of arm extension 72 extends beyond the outwardly-extending frame members 22.

Referring back to FIGS. 2 and 3 to show the operation of the lift assembly 30, the boat 80 is manually moved from a position outward and alongside the boat carrier inward toward the boat carrier and is placed on the outward portion of the lift assembly arms 70 in a lowered position. The boat is placed on the lift assembly arms with one end portion of the boat on the front lift assembly arm, and the other end portion of the boat on the rear lift assembly arm so that the boat is essentially centrally aligned with the boat carrying frame. The boat ends can extend forward and aft of the lift assemblies (FIG. 1). This will distribute the weight substantially evenly between the lift assemblies. With the motors of each lift assembly having power applied simultaneously by their motor controls 92 upon operation of the activation switch 94, the lift assembly arms will be synchronized in their vertical movement. When the lift assembly operation is initiated, the lift assembly arms raise the boat to a raised position 80a coincident with one of the outwardly-extending frame members 22. The operator then slides the boat inward, onto the outwardly-extending frame members, into position 80b. If the outwardly-extending frame members 22 are in the topmost position as shown, the boat may be slid onto the top center support 24, position 80c. In reverse operation, the operator reverses the winch motor with activation switch 94, allowing the lift arm support 60 and the lift assembly arm 70 to return to the lowered position.

When the boat loading operation is on the opposite side of the boat carrier 10 from which the lift assembly is located, the lift assembly arm is mounted to the moveable carriage by the keyhole bolt 77b being inserted into the keyhole slot 76 and the attachment handle 74 being secured to the T-nut 75b. The arm extension 72 is then inserted into the lift assembly arm 70 so that the arm extension extends outward from the outwardly-extending frame members 22a. The mounting of the lift assembly arm and the arm extension is repeated for each lift assembly on the boat carrier. The boat is then placed on the arm extensions in position 80d with its weight approximately distributed evenly between them, in the manner described previously. The activation switch 94 is activated and the power is then provided to each electric winch 50 simultaneously to allow the boat to raise evenly until it reaches an aligned position to the desired outwardly-extending frame members. The boat is then manually slid onto the outwardly-extending frame members, power is reversed to the electric winch to allow the moveable carriage, lift assembly arm, and arm extension to return to their lowered position, and the boat is secured to the boat carrying frame. Because of the presence of vertical members 20, the boat 80 must be loaded manually when it is to be placed in a center section of the boat-carrying frame.

The lift assembly of the present invention solves the problems of transportation of the lift as well as the many safety issues, as described above. The lift assembly enables the boats to be easily lifted and stored onto the boat carrier storage rack, even if the environment where the boat carrier is utilized has uneven ground or does not support the use of wheels on the manual lift.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A boat lift system for a boat carrier comprising:
   a boat carrier having a chassis supported by wheels and a boat-carrying frame on the chassis including upwardly-extending frame members and a plurality of frame members extending outwardly away from the upwardly-extending frame members on opposite sides of the boat-carrying frame for securing a boat during transit of the boat carrier; and
   a lift assembly mounted on a carriage movable in a substantially linear vertical path with respect to the chassis, the lift assembly including at least one removably attachable vertically moveable lift assembly arm extending away from the boat-carrying frame, the at least one lift assembly arm being attachable in a first position to extend beyond the outwardly-extending frame members on one side of the boat-carrying frame, the at least one lift assembly arm being attachable in a second position to extend beyond the outwardly-extending frame members on the opposite side of the boat-carrying frame, the at least one lift assembly arm being moveable between a lowered position whereby a boat may be placed on the at least one lift assembly arm and a raised position wherein an inward portion of the at least one lift assembly arm is aligned with and positioned alongside one of the outwardly-extending frame members whereby the boat may be transferred from the at least one lift assembly arm onto the outwardly-extending frame member.

2. The system of claim 1 wherein the frame includes front and rear upwardly-extending members on the boat carrier chassis, and wherein the at least one lift assembly is associated with at least one of the upwardly-extending members.

3. The system of claim 2 including a front lift assembly associated with a front upwardly-extending member and a rear lift assembly associated with a rear upwardly-extending member.

4. The system of claim 1 wherein in the raised position the lift assembly arm may be aligned with one of the outwardly-extending frame members to slide the boat from the lift assembly arm onto the outwardly-extending frame member.

5. The system of claim 1 wherein the frame includes outwardly-extending members at a plurality of different heights, and wherein the lift assembly arm may be aligned at each different height of the outwardly-extending frame members.

6. The system of claim 1 wherein the lift assembly arm is adapted to receive a boat in the lowered position from a point outward, relative to the upwardly-extending members, of the outwardly-extending frame members and lift the boat to the lift assembly arm raised position aligned with one of the outwardly-extending frame members, whereby the boat may be slid inward from the lift assembly arm toward the upwardly-extending members and onto the one of the outwardly-extending frame members.

7. The system of claim 1 wherein the lift assembly arm includes an arm extension removably attached to an outward portion of the lift assembly arm.

8. A method of lifting and transporting a boat on a boat carrier comprising:
   providing a boat carrier having a chassis supported by wheels and a boat-carrying frame, the boat-carrying frame including upwardly-extending frame members and a plurality of frame members extending outwardly away from the upwardly extending frame members on opposite sides of the boat-carrying frame for securing a boat during transit of the carrier and at least one lift assembly mounted on a moveable carriage on an upwardly-extending frame member, the lift assembly including at least one removably attachable vertically moveable lift assembly arm extending away from the carriage on the upwardly-extending frame member, the at least one lift assembly arm being attachable in a first position to extend beyond ends of the outwardly-extending frame members on one side of the boat-carrying frame, the at least one lift assembly arm being attachable in a second position to extend beyond the outwardly-extending frame members on the opposite side of the boat-carrying frame, the at least one lift assembly arm being moveable between a lowered position whereby a boat may be placed on the at least one lift assembly arm and a raised position aligned with one of the outwardly-extending frame members;
   attaching the at least one lift assembly arm being in a first position to extend beyond ends of the outwardly-extending frame members on one side of the boat-carrying frame;
   placing a first boat on the at least one lift assembly arm in the lowered position from a point outward of the outwardly-extending frame members on one side of the boat-carrying frame;
   lifting the first boat with the at least one lift assembly arm to the raised assembly arm position aligned with one of the outwardly-extending frame members on the one side of the boat-carrying frame;
   transferring the first boat from the at least one lift assembly arm onto the aligned outwardly-extending frame member on the one side of the boat-carrying frame;
   attaching the at least one lift assembly arm being in a second position to extend beyond ends of the outwardly-extending frame members on the opposite side of the boat-carrying frame;
   placing a second boat on the at least one lift assembly arm in the lowered position from a point outward of the outwardly-extending frame members on the opposite side of the boat-carrying frame;
   lifting the second boat with the at least one lift assembly arm to the raised assembly arm position aligned with one of the outwardly-extending frame members on the opposite side of the boat-carrying frame; and
   transferring the second boat from the at least one lift assembly arm onto the aligned outwardly-extending frame member on the opposite side of the boat-carrying frame.

9. The method of claim 8 wherein the frame includes front and rear upwardly-extending members on the boat carrier chassis, and wherein a front lift assembly is associated with the front upwardly-extending member and a rear lift assembly is associated with the rear upwardly-extending member; and wherein one end of the boat is placed on a front lift assembly arm on the front lift assembly and the other end of the boat is placed on a rear lift assembly arm on the rear lift assembly.

10. The method of claim 8 wherein the boat is placed on the lift assembly arm in the lowered position from a point outward of the lift assembly arm, relative to the upwardly-extending members.

11. The method of claim 8 wherein the lift assembly arm includes an inward portion positionable alongside the outwardly-extending frame members when the lift assembly arm is in the raised position, and wherein the boat is slid inward from the lift assembly arm toward the upwardly-extending members and onto the one of the outwardly-extending frame members.

12. The method of claim 8 wherein there is additionally provided an arm extension removably attachable to the outward portion of the lift assembly arm, and wherein the arm extension is attached to the lift assembly arm.

13. The method of claim 8 wherein the outwardly-extending frame members are at a plurality of different heights and wherein the lift assembly arm may be aligned at each different height of the outwardly-extending frame members.

14. The method of claim 8 wherein the lift assembly arm includes an inward portion positionable alongside the outwardly-extending frame members when the lift assembly arm is in the raised position.

15. The method of claim 8 wherein the lift assembly arm is adapted to receive a boat in the lowered position from a point outward of the outwardly-extending frame members and lift the boat to the lift assembly arm raised position aligned with one of the outwardly-extending frame members, whereby the boat may be slid inward from the lift assembly arm to the one of the outwardly-extending frame members.

\* \* \* \* \*